(12) United States Patent
Zenou et al.

(10) Patent No.: US 11,590,701 B2
(45) Date of Patent: Feb. 28, 2023

(54) SYSTEMS FOR PREVENTING OXYGEN INHIBITION OF A LIGHT-INITIATED POLYMERIZATION REACTION IN A 3D PRINTING SYSTEM USING UNIFORM PLANAR SURFACES

(71) Applicant: IO Tech Group Ltd., London (GB)

(72) Inventors: Michael Zenou, Hashmonaim (IL); Ziv Gilan, Kfar-harif (IL); Daniel Liptz, Jerusalem (IL); Yuval Shai, Hashmonaim (IL)

(73) Assignee: IO Tech Group Ltd., Modiin (IL)

( * ) Notice: Subject to any disclaimer, the term of this patent is extended or adjusted under 35 U.S.C. 154(b) by 0 days.

(21) Appl. No.: 17/819,279

(22) Filed: Aug. 11, 2022

(65) Prior Publication Data

US 2022/0379560 A1 Dec. 1, 2022

Related U.S. Application Data

(62) Division of application No. 16/703,423, filed on Dec. 4, 2019, now Pat. No. 11,453,164.

(Continued)

(51) Int. Cl.
*B29C 64/264* (2017.01)
*B29C 64/245* (2017.01)
(Continued)

(52) U.S. Cl.
CPC ........ *B29C 64/264* (2017.08); *B29C 35/0288* (2013.01); *B29C 35/0805* (2013.01);
(Continued)

(58) Field of Classification Search
CPC ........ B29C 2035/0827; B29C 35/0288; B29C 35/0805; B29C 59/04; B29C 64/10;
(Continued)

(56) References Cited

U.S. PATENT DOCUMENTS 5,059,266 A 10/1991 Yamane et al.
5,143,817 A 9/1992 Lawton et al.
(Continued)

FOREIGN PATENT DOCUMENTS

CN 1131741 A 9/1996
CN 205467381 U 8/2016
(Continued)

OTHER PUBLICATIONS

The First Office Action dated Oct. 17, 2022, from The National Intellectual Property Administration of the People's Republic of China, for Chinese Patent Application No. 201980082395.5, 15 pgs.
(Continued)

*Primary Examiner* — Michael M. Robinson
*Assistant Examiner* — Victoria Bartlett
(74) *Attorney, Agent, or Firm* — Ascenda Law Group, PC

(57) ABSTRACT

Systems and methods that prevent oxygen inhibition of a light-initiated polymerization reaction by forcing the oxygen away from the reaction surfaces. In some embodiments, oxygen is purged by bringing a planarizing surface (e.g., a thin transparent film and/or a transparent planar surface) into contact with a layer of UV curable material disposed on a workpiece and then moving the planarizing surface away from the workpiece one the UV material is cured.

17 Claims, 14 Drawing Sheets

Related U.S. Application Data

(60) Provisional application No. 62/777,902, filed on Dec. 11, 2018.

(51) Int. Cl.
  *B29C 64/106* (2017.01)
  *B29C 64/371* (2017.01)
  *B29C 35/02* (2006.01)
  *B29C 35/08* (2006.01)
  *B29C 59/04* (2006.01)
  *B33Y 10/00* (2015.01)
  *B33Y 30/00* (2015.01)
  *B33Y 40/00* (2020.01)

(52) U.S. Cl.
  CPC ............ *B29C 59/04* (2013.01); *B29C 64/106* (2017.08); *B29C 64/245* (2017.08); *B29C 64/371* (2017.08); *B29C 2035/0827* (2013.01); *B33Y 10/00* (2014.12); *B33Y 30/00* (2014.12); *B33Y 40/00* (2014.12)

(58) Field of Classification Search
  CPC ... B29C 64/106; B29C 64/245; B29C 64/264; B29C 64/364; B29C 64/371; B33Y 10/00; B33Y 30/00; B33Y 40/00
  See application file for complete search history.

(56) References Cited

U.S. PATENT DOCUMENTS

| | | | |
|---|---|---|---|
| 5,447,822 | A | 9/1995 | Hull et al. |
| 2010/0259589 | A1 | 10/2010 | Barry et al. |
| 2012/0090691 | A1 | 4/2012 | Baluja et al. |
| 2012/0126457 | A1 | 5/2012 | Abe et al. |
| 2013/0078013 | A1 | 3/2013 | Chillscyzn et al. |
| 2013/0101803 | A1 | 4/2013 | Grabe et al. |
| 2015/0306825 | A1* | 10/2015 | Chen ................... B29C 64/124 425/135 |
| 2018/0015542 | A1 | 1/2018 | Muranaka |
| 2018/0079004 | A1 | 3/2018 | Herzog et al. |
| 2019/0270242 | A1 | 9/2019 | Medalsy |
| 2020/0033270 | A1 | 1/2020 | Wynne et al. |

FOREIGN PATENT DOCUMENTS

| | | |
|---|---|---|
| CN | 206551490 U | 10/2017 |
| EP | 0435564 A2 | 7/1991 |
| EP | 0435564 A3 | 7/1991 |
| EP | 3147047 A1 | 3/2017 |

OTHER PUBLICATIONS

Non-Final Office Action dated Jul. 28, 2021, for U.S. Appl. No. 16/703,417, filed Dec. 4, 2019, 10 pgs.
Amendment filed Sep. 2, 2021, for U.S. Appl. No. 16/703,417, filed Dec. 4, 2019, 9 pgs.
Notice of Allowance dated Sep. 16, 2021, for U.S. Appl. No. 16/703,417, filed Dec. 4, 2019, 8 pgs.
Restriction Requirement dated Jun. 3, 2021, for U.S. Appl. No. 16/703,417, filed Dec. 4, 2019, 6 pgs.
Amendment filed Jun. 23, 2021, for U.S. Appl. No. 16/703,417, filed Dec. 4, 2019, 5 pgs.
International Search Report and Written Opinion dated Feb. 17, 2020, from the ISA/European Patent Office, for International Application No. PCT/IB2019/060451, 13 pages.
International Preliminary Report on Patentability dated Mar. 29, 2021, from the IPEA/European Patent Office, for International Patent Application No. PCT/IB2019/060451 (filed Dec. 4, 2019), 10 pgs.
Written Opinion of the International Preliminary Examining Authority dated Nov. 13, 2020, from the IPEA/European Patent Office, for International Patent Application No. PCT/IB2019/060451 (filed Dec. 4, 2019), 4 pages.
International Search Report and Written Opinion dated Feb. 18, 2020, from the ISA/European Patent Office, for International Application No. PCT/IB2019/060453, 12 pages.
International Preliminary Report on Patentability dated Mar. 31, 2021, from the IPEA/European Patent Office, for International Patent Application No. PCT/IB2019/060453 (filed Dec. 4, 2019), 12 pgs.
Written Opinion of the International Preliminary Examining Authority dated Nov. 13, 2020, from the IPEA/European Patent Office, for International Patent Application No. PCT/IB2019/060453 (filed Dec. 4, 2019), 5 pages.
Amendment filed Jun. 24, 2021, for U.S. Appl. No. 16/703,423, filed Dec. 4, 2019, 7 pgs.
Final Office Action dated Sep. 15, 2021, for U.S. Appl. No. 16/703,423, filed Dec. 4, 2019, 9 pgs.
Amendment filed Oct. 4, 2021, for U.S. Appl. No. 16/703,423, filed Dec. 4, 2019, 6 pgs.
Advisory Action dated Oct. 21, 2021, for U.S. Appl. No. 16/703,423, filed Dec. 4, 2019, 3 pgs.
Non-Final Office Action dated Dec. 15, 2021, for U.S. Appl. No. 16/703,423, filed Dec. 4, 2019, 10 pgs.
Amendment filed Jan. 4, 2022, for U.S. Appl. No. 16/703,423, filed Dec. 4, 2019, 6 pgs.
Final Office Action dated Mar. 28, 2022, for U.S. Appl. No. 16/703,423, filed Dec. 4, 2019, 9 pgs.
Notice of Allowance dated Aug. 10, 2022, for U.S. Appl. No. 16/703,423, filed Dec. 4, 2019, 12 pgs.
Advisory Action dated May 23, 2022, for U.S. Appl. No. 16/703,423, filed Dec. 4, 2019, 4 pgs.
Amendment filed May 19, 2022, for U.S. Appl. No. 16/703,423, filed Dec. 4, 2019, 8 pgs.
Amendment filed Apr. 26, 2022, for U.S. Appl. No. 16/703,423, filed Dec. 4, 2019, 7 pgs.
EP Examination Report dated Jul. 6, 2022, from the European Patent Office, for European Patent Application No. 19832727.2, 4 pgs.
The First Office Action dated Oct. 8, 2022, from The National Intellectual Property Administration of the People's Republic of China, for Chinese Patent Application No. 201980082465.7, 20 pgs.

* cited by examiner

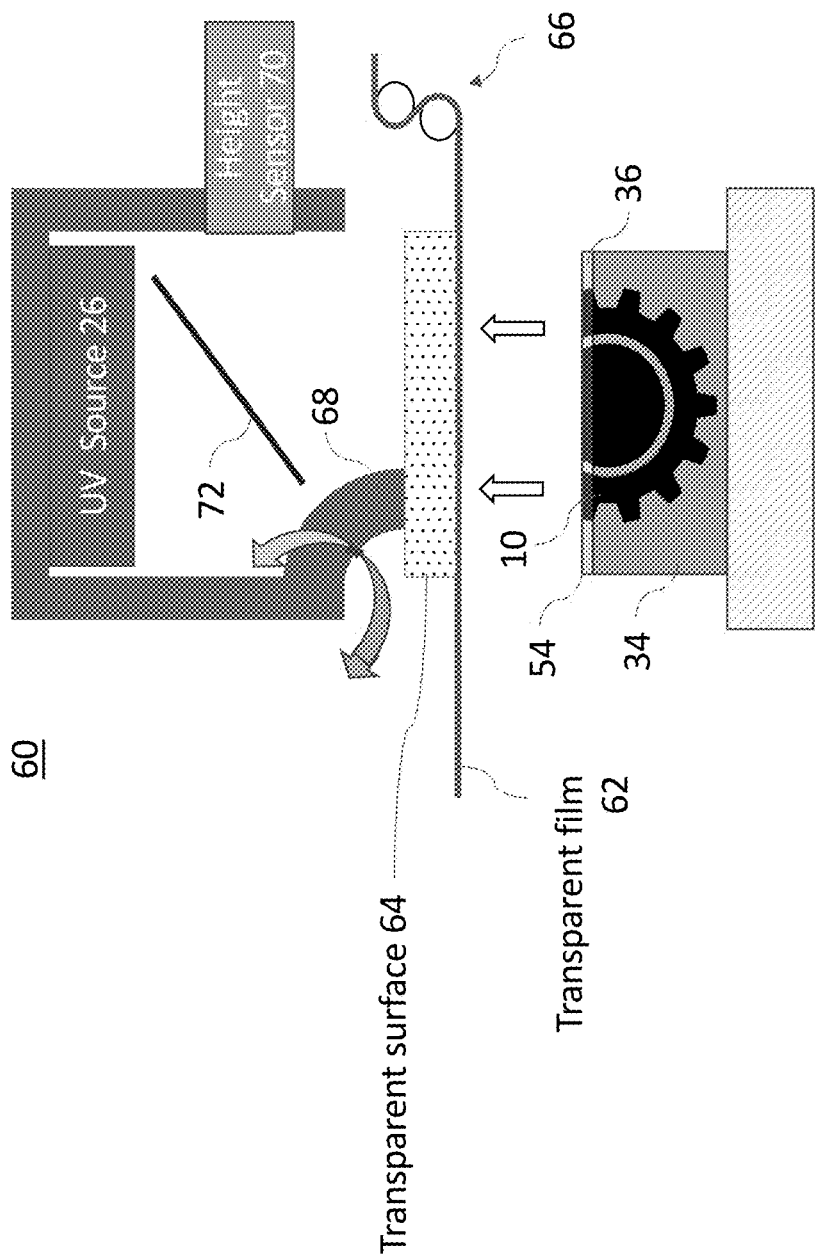

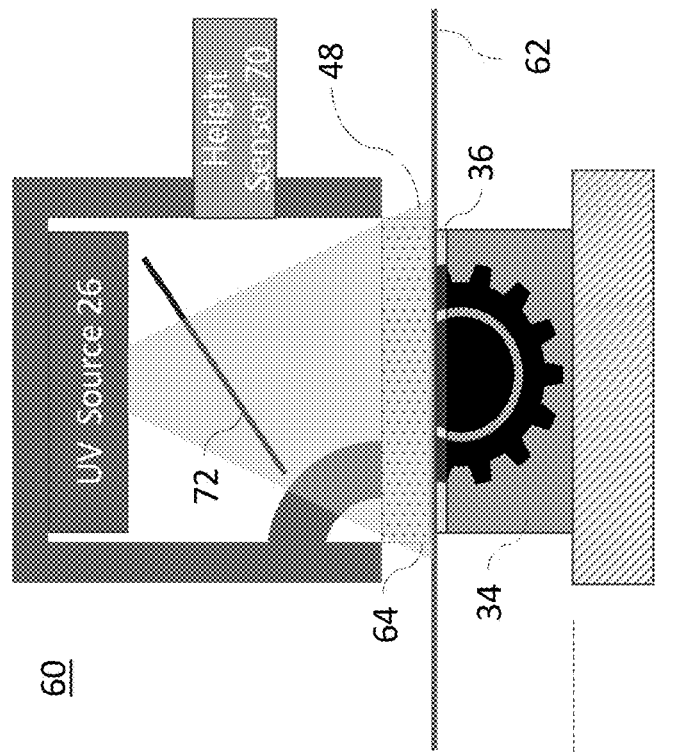
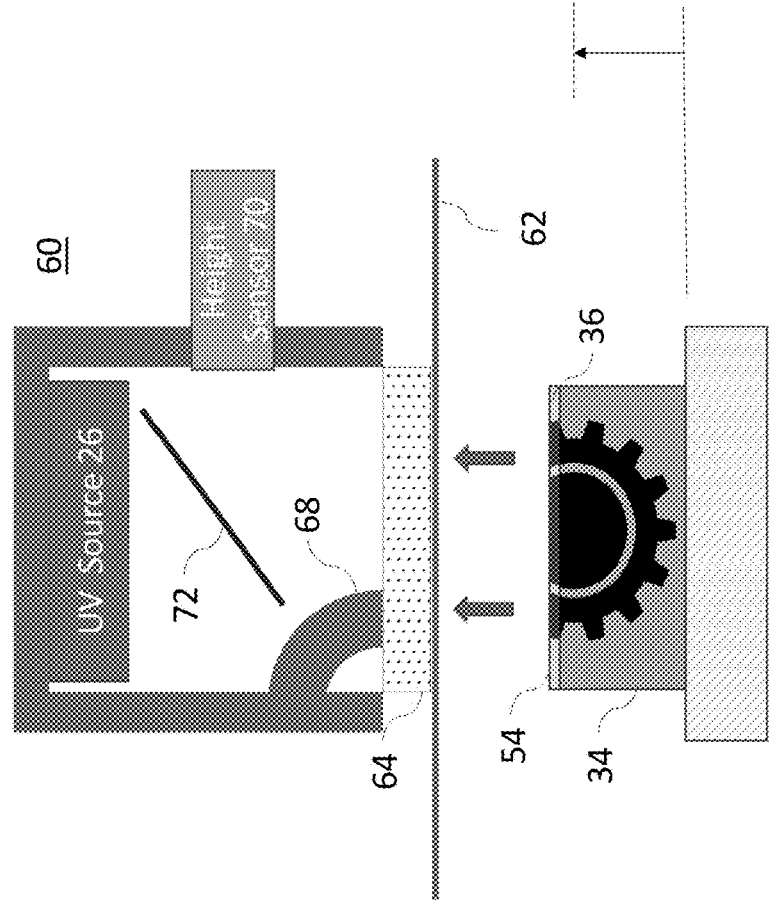
Figure 3b
Figure 3a

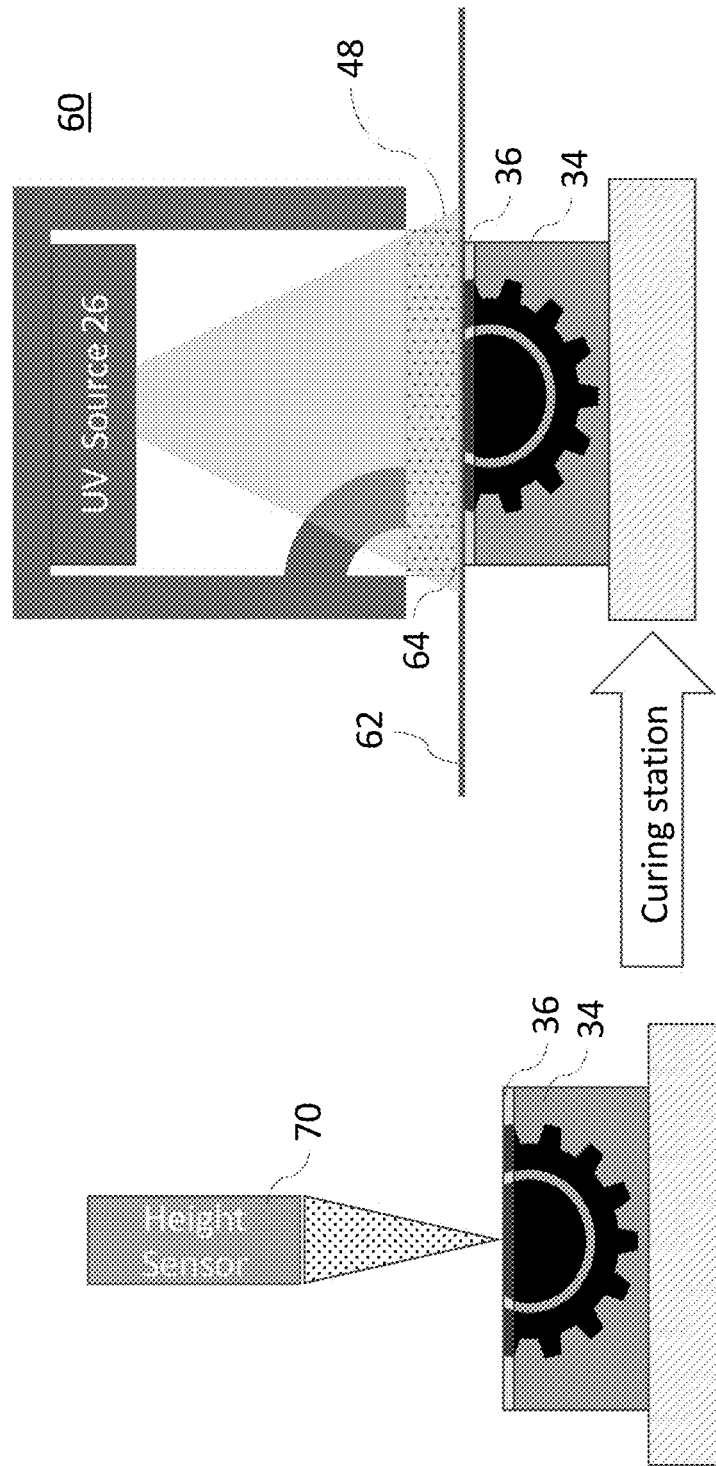

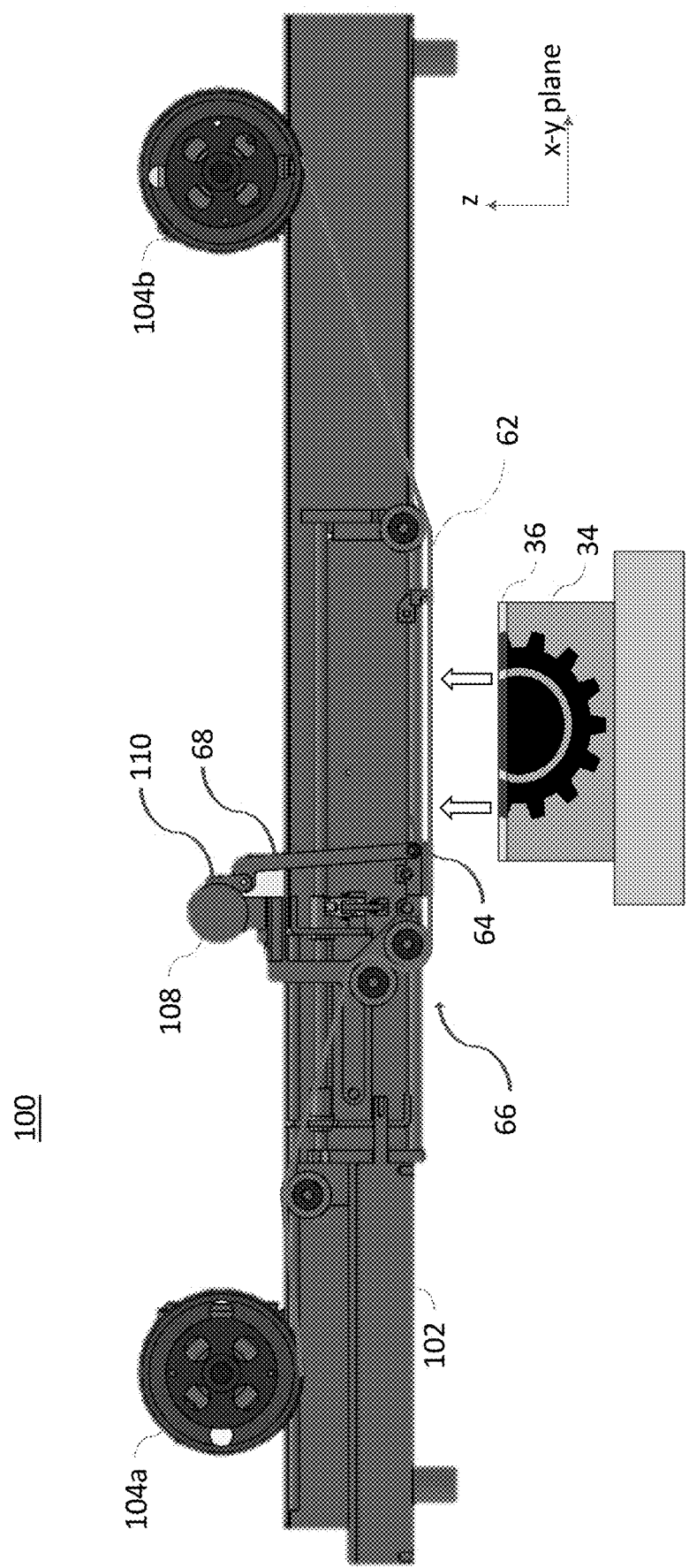

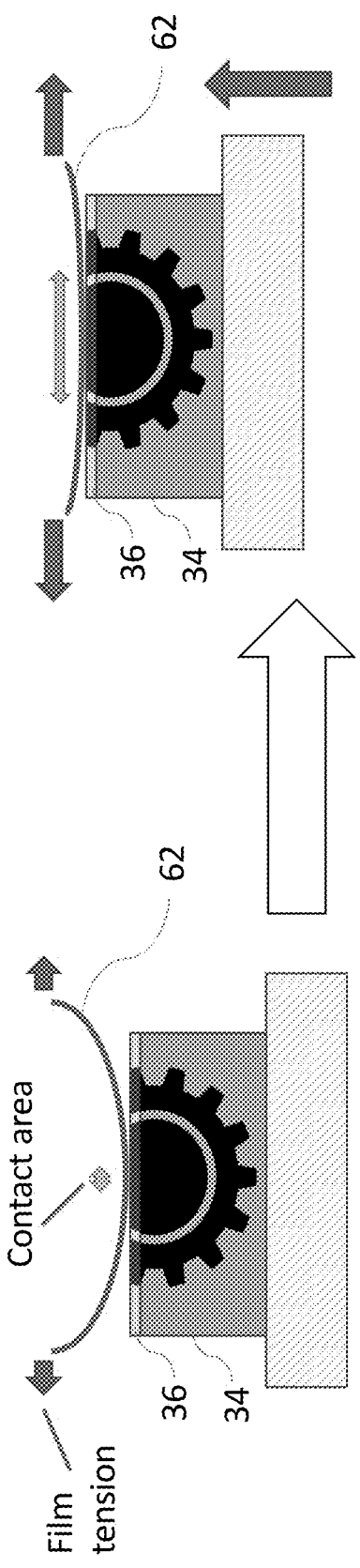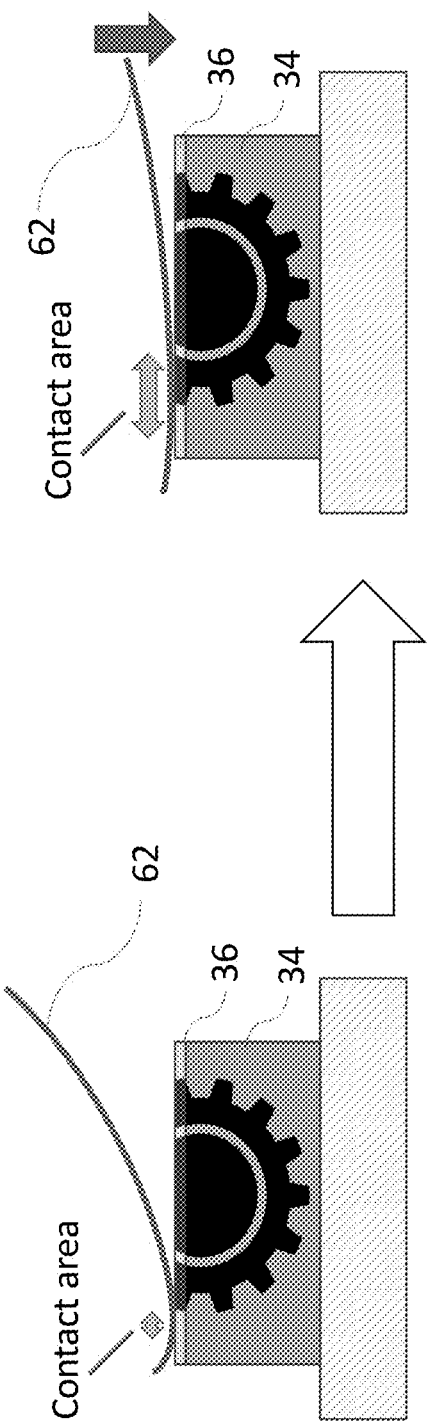

SYSTEMS FOR PREVENTING OXYGEN INHIBITION OF A LIGHT-INITIATED POLYMERIZATION REACTION IN A 3D PRINTING SYSTEM USING UNIFORM PLANAR SURFACES

RELATED APPLICATIONS

This application is a Divisional of U.S. application Ser. No. 16/703,423, filed 4 Dec. 2019 (now issued as U.S. Pat. No. 11,453,164), which is a nonprovisional of and claims priority to U.S. Provisional Application No. 62/777,902, filed 11 Dec. 2018, both of which are incorporated herein by reference.

FIELD OF THE INVENTION

The present invention relates to a system that prevents oxygen inhibition of a light-initiated polymerization reaction used by a 3D printing system by purging the oxygen from the reaction surface using inert gas flow, or by forcing the oxygen away from the reaction surface by covering it with a rigid planar surface.

BACKGROUND

Many additive manufacturing, or so-called three-dimensional ("3D") printing, applications use ultraviolet ("UV") light-curable polymers. The UV curing process consists of three stages: photoinitiation, propagation, and termination. During photoinitiation, a photoinitiator produces free radicals when exposed to UV radiation. These free radicals react with nearby monomers and convert them into free radicals. Next, in the propagation stage, the free radical monomers bond with other monomers and turn those monomers into free radicals. In this way the monomers form a polymer chain. The process continues until it reaches termination. Termination can occur in many ways, including if two chains bond with one another, the free radical transfers to a monomer, or if the chain reacts with molecules from the environment and not a monomer.

There are two interactions between oxygen and the photopolymer that inhibit curing: quenching and scavenging. After the photoinitiator has been excited by exposure to UV radiation, it produces a free radical. Molecular oxygen easily reacts with this free radical, preventing it from reacting with monomers in the process of chain propagation. This is the quenching reaction. This reaction also produces an oxygen free radical. In the scavenging reaction, this oxygen free radical reacts with a free radical that is part of a propagating polymer chain. This reaction results in a less reactive free radical, which leads to early termination of the polymerization process. These two processes can be written as:

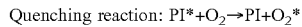

Quenching reaction: $PI^* + O_2 \rightarrow PI + O_2^*$

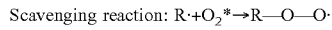

Scavenging reaction: $R\cdot + O_2^* \rightarrow R\text{—}O\text{—}O\cdot$

Because of these phenomena, if a photopolymer is exposed to oxygen during curing in a 3D printing process it can result in uncured polymer residue on surfaces exposed to the air.

SUMMARY OF THE INVENTION

In one embodiment of the invention, oxygen is purged from a surface of UV curable material using a thin transparent film and/or a transparent planar surface which is/are brought into contact with the UV curable material. In one example, the workpiece with a layer of UV curable material is lifted into contact with the film. Film tension is controlled to optimize removal of oxygen bubbles. Rollers can also be used to remove bubbles. An arm holding the transparent planar surface is rotated downward, causing the plate to contact the film and UV curable material starting at one end and continuing gradually to the other end. This further aids in the removal of air bubbles. Contact between the UV curable material and the planarizing surface is monitored using a camera that measures reflectivity of the planarizing surface. This process also planarizes the UV curable material layer, ensuring planarity of the top of the layer during UV curing. After complete contact is accomplished, a UV light cures the UV curable material layer. The planarizing surface is then lifted away from the printed object and the film is peeled away.

In other embodiments of the invention, only a thin film under tension is used to contact the UV curable material and effect planarization, without the rigid plate. The same method of peeling the film with rollers may be used. Or, only a rigid plate may be used to contact the UV curable material and effect planarization, without the film in tension.

These and further embodiments of the invention are described below with reference to the accompanying drawings, in which the present invention is illustrated by way of example, and not limitation.

BRIEF DESCRIPTION OF THE DRAWINGS

FIG. 2 illustrates a UV curing system configured in accordance with another embodiment of the invention in which a transparent plate and film are used to prevent oxygen inhibition of the polymerization process during a UV curing process.

FIGS. 3a and 3b illustrate aspects of the operation of the UV curing system shown in FIG. 2; in particular: in FIG. 3a a UV curable material layer is lifted into contact with a film and plate arrangement, forcing out oxygen at the interface therebetween, and in FIG. 3b, after oxygen has been removed, the UV curable material layer is UV-cured.

FIGS. 6a and 6b illustrate an example of a height sensor measuring the height of a workpiece before curing and using previous calibrated measurements to determine the contact distance to a film in accordance with an embodiment of the present invention.

FIGS. 8, 9, 11, and 12 illustrate aspects of an assembly for carrying a transparent film and transparent surface used in connection with the UV curing system shown in FIG. 2 to remove oxygen before UV curing.

FIGS. 10a-10d illustrate aspects of one method for optimizing film contact in the UV curing system shown in FIG. 2.

DETAILED DESCRIPTION

Figure 1C:
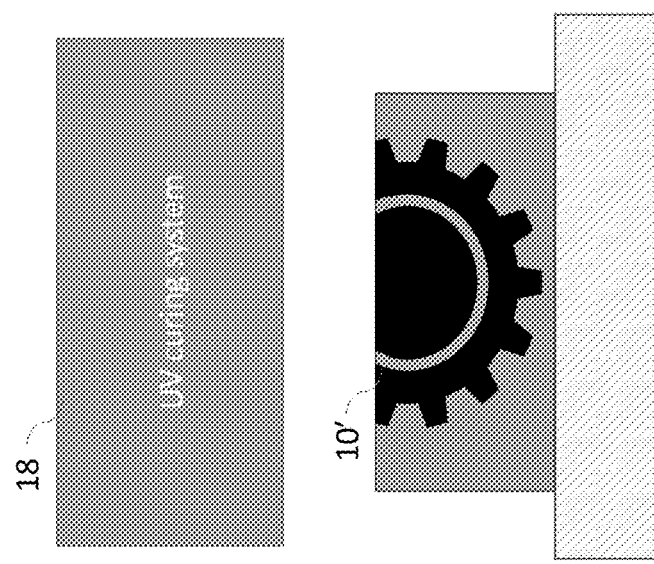
FIGS. 1a-1c illustrate points in a conventional 3D printing process in which an object to be printed (FIG. 1a) has deposited thereon a layer of UV curable material (FIG. 1b), which is subsequently cured through exposure to UV light (FIG. 1c).
Figure 1B:
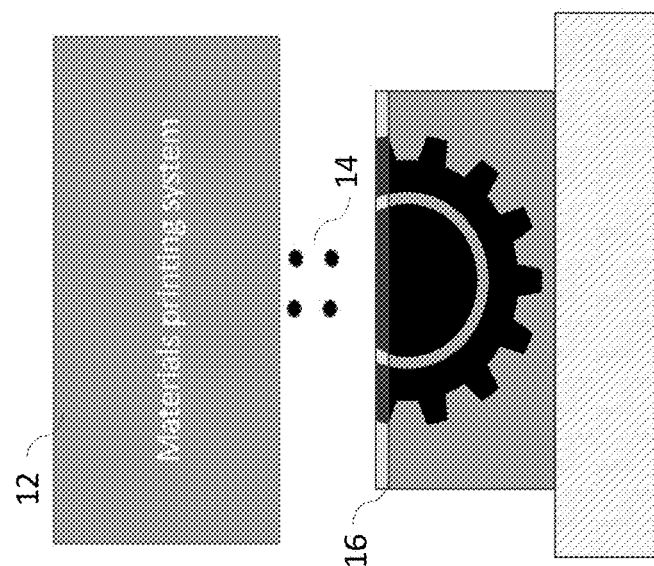
Figure 1A:
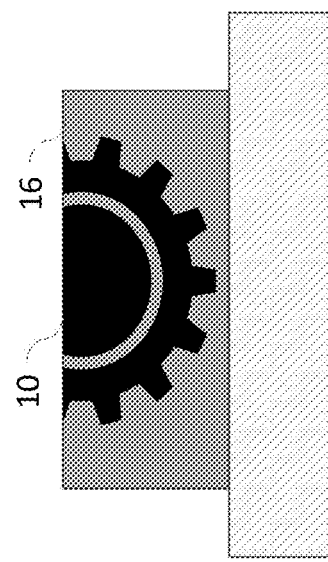

Embodiments of the invention provide systems and methods for preventing oxygen inhibition of a light-initiated polymerization reaction at ambient conditions. Before describing the invention in detail, it is helpful to present an overview. Referring to the sequence of images shown in FIGS. 1a, 1b, and 1c, in many 3D printing processes in which an object 10 is undergoing fabrication, a materials printing system 12 is used to deposit UV curable material 14 on a surface 16. This deposited material is then cured with a UV light source 18 to produce a new layer of the desired part 10'. This process continues until the part undergoing fabrication is completed.

Referring now to FIGS. 2-5 which illustrate an embodiment of the invention, in a UV curing system 60 oxygen is purged from a surface 54 of a UV curable layer 36 using a thin transparent film made of a material having anti-sticking properties, such as cellulose, Parafilm (a plastic paraffin film), Teflon or other polytetrafluoroethylene-based polymer, etc., 62 and a transparent planar surface 64, which are disposed between the UV source 26 and the UV curable layer 36. The film 62 and surface 64 are transparent at one or more wavelengths of the UV source 62 at which curing of the photocurable material used to fabricate the part under construction is achieved.

As shown in these illustrations, after the UV curable material 36 has been deposited on the print surface, the UV curable material layer (i.e., the workpiece 34) is lifted into contact with the film 62. By pressing the surface of the UV curable material 36 against the thin transparent film 62, oxygen is forced out from the interface between the two. This process may be assisted using a pair (or multiple pairs) of rollers 66 to adjust the film tension, thereby removing oxygen bubbles from the surface of the UV curable material 36.

An arm 68 of UV curing system 60 holds the transparent surface 64 and is rotated downward, about an axis as represented in the drawings, causing the surface 64 to contact the film 62 and UV curable material 36 in an angular fashion starting at one end of the surface 64 and continuing gradually to the other end. The action resembles that of a door closing on a hinge, with the hinge point being near the end of the surface 64 to first contact the film 62. This hinge-like manner of slowly contacting the entirety of the film 62 over the length of the transparent surface 64 further aids in the removal of oxygen (e.g., in the form of air bubbles) from the interface of the film 62 and UV curable material 36. Transparent surface 64 is sometimes referred to as a planarizing surface as its presence tends to ensure planarity of the top of the UV curable material layer during UV curing. That is, the transparent surface 64, being a rigid surface abutting the film 62 which overlies and touches the UV curable material 36, acts as a stop, ensuring a uniform layer of the UV curable material at the time it is exposed to light from the UV source.

Contact between the film 62 and UV curable material 36 and the planarizing surface 64 can be checked using a camera or other sensor that measures reflectivity as a height sensor 70. As the workpiece with UV curable material 36 on top comes into contact with the film 62, the film's reflectivity changes. By measuring the reflectivity, the system can determine when full contact has been achieved.

Several options exist for a height sensor. In one example, shown in FIGS. 2-4a and 7a, the height sensor is displaced to one side of the optical path between the UV source 26 and the workpiece and a partially reflecting mirror or other optical component 72 that allows UV light 48 at the wavelengths of interest for curing the UV curable material 36 to pass while reflecting light 90 at wavelengths of interest for the height sensor is positioned in that optical path. In the various examples described herein, the height sensor operates with light at wavelengths that will not initiate photocuring of the UV material curable layer. For example, light in the infra-red spectrum may be used. Now, as the workpiece with UV curable material 36 on top is brought into contact with the film 62 and the transparent surface 64 is lowered into position over top thereof, the process is monitored by height sensor 70 which receives input from light 90 reflected from the film 62 towards the height sensor 70 by mirror 72.

After complete contact between the film 62 and transparent surface 64 with the workpiece 34 is accomplished, UV light 48 from UV source 26 cures the layer of UV curable material 36, as shown in FIG. 3b. Because mirror 72, transparent plate 64, and transparent film 62 are transparent (or nearly so) at the wavelength(s) of the curing UV light, the light at that wavelength emitted by UV source 26 passes through mirror 72, transparent plate 64, and transparent film 62 relatively unaltered and is incident upon the UV curable material 36. After the layer of UV curable material 36 has been cured, the UV light from source 26 is stopped and the transparent surface 64 is lifted away from the printed object.

Figure 7B:
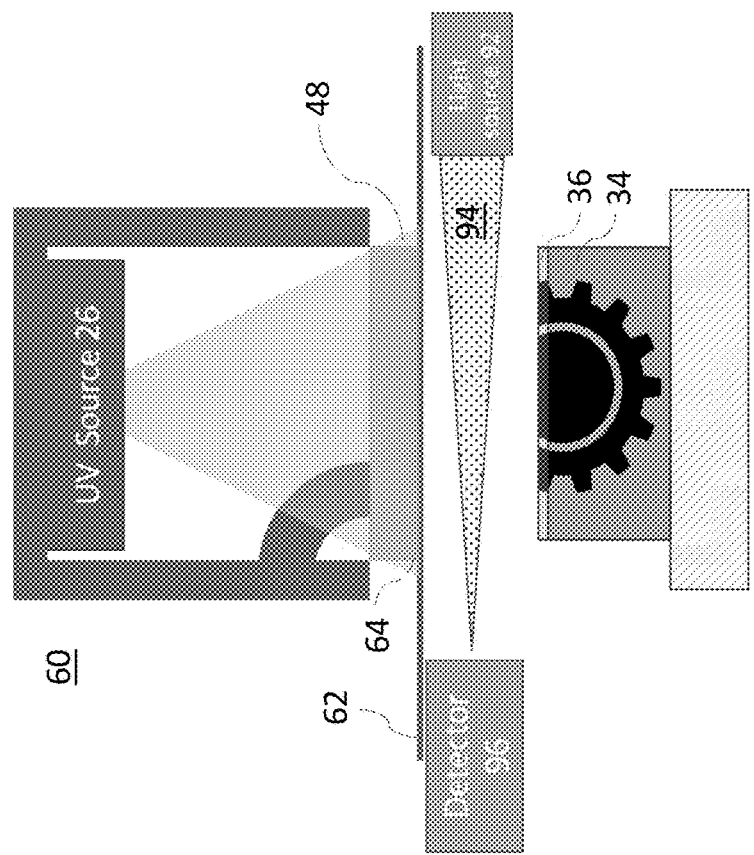
FIGS. 7a and 7b illustrate examples of height sensors that measure the height of a UV curable layer in real time to control contact with a film and transparent surface in accordance with an embodiment of the present invention.
Figure 7A:
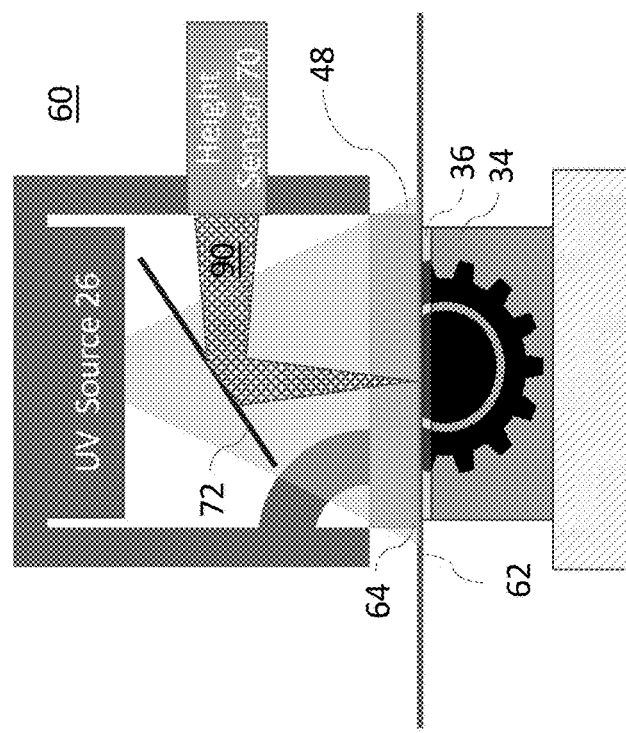

An alternative arrangement of a height sensor is illustrated in FIG. 7b. In this example, a light source 92 directs a beam of light 94 towards a detector 96. The light source and detector are arranged on opposite sides of the workpiece 34 so that when the workpiece is raised to contact the film 62, the beam of light 94 will be blocked from the detector 96. The absence of the light reaching the detector acts as a signal that the workpiece has been raised to the proper height and the UV curing process can commence. Note that in this description a single height sensor is described, however, in practice, for any of the described embodiments, there may be multiple height sensors used concurrently and the relative distance between the workpiece and the film evaluated on the basis of a combination, possibly weighted combination, of the outputs provided by each of such multiple height sensors.

Still another arrangement for a height sensor 70 is shown in FIG. 6a. In this example, the height sensor is located and operated remotely from the UV curing system and measures the height of the workpiece 34 before the curing process begins. The workpiece is then brought within the operating area of the UV curing system 60 and, based on previously calibrated measurements, is raised by an amount deemed necessary from the measured height to be brought into contact with film 64, as shown in FIG. 6b. Still further height sensor arrangements may utilize one or more pressure sensors or strain gauges (not shown) to determine when the workpiece has contacted the film 62. For example, when the workpiece is brought into contact with the film 62 some deformation of the film may be expected. A conductive strip associated with the film (in a non-working area thereof) may likewise experience deformation if the film is under tension and the resulting change in measurements of electrical current flowing through the conductive strip may signal that sufficient contact between the workpiece and the film has been achieved.

Once the curing process has completed and the transparent surface 64 has been lifted away, the film 62 may then be removed from the workpiece. Care must be taken, however, not to damage the newly-cured layer of UV curable material during this process. Accordingly, rather than simply lowering the workpiece away from the transparent film 62, which might cause the film to adhere to the workpiece and ultimately tear newly-cured layer of UV curable material when it separates therefrom, a series of rollers are employed to peel the film away from the workpiece. By achieving a large angle at the point of separation between the film and the workpiece damage to the printed object, e.g., from lateral or other forces, is avoided. Even in embodiments of the invention where only a thin film 62 under tension is used to contact the workpiece 34 and effect planarization, without the transparent surface 64, this same method of removing the film with rollers may be used. So too may this method be employed in embodiments where only a transparent surface 64 is used to contact the workpiece and effect planarization without a film.

Figure 4C:
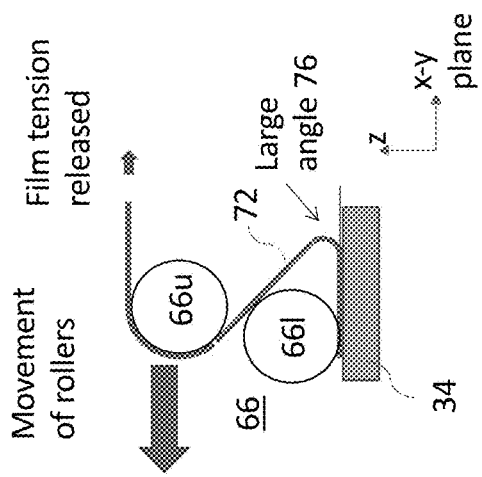
FIGS. 4a, 4b, and 4c illustrate aspects of the operation of the UV curing system shown in FIG. 2, in particular, in FIG. 4a the transparent plate is lifted away from the workpiece and rollers peel away the film, and illustrate the film being peeled away by rollers with (FIG. 4b) and without (FIG. 4c) constant film tension, resulting in either a small angle of detachment of the film from the cured layer or a large angle of detachment of the film from the cured layer, respectively.
Figure 4B:
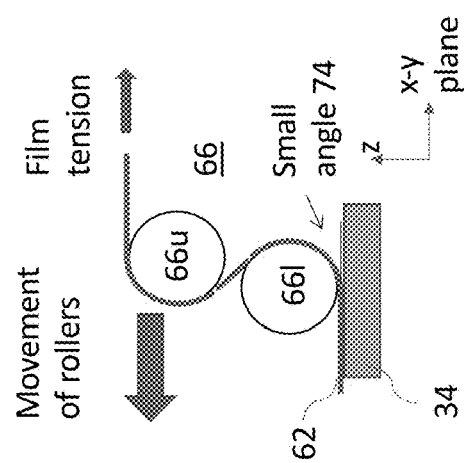
Figure 4A:
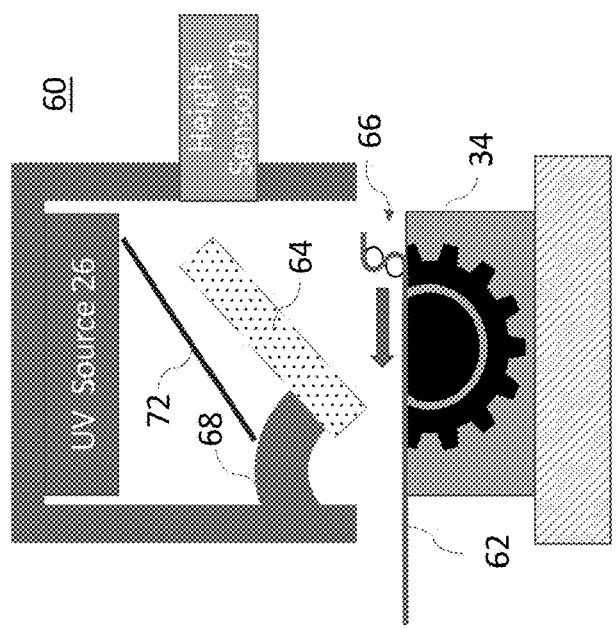
Figure 5:
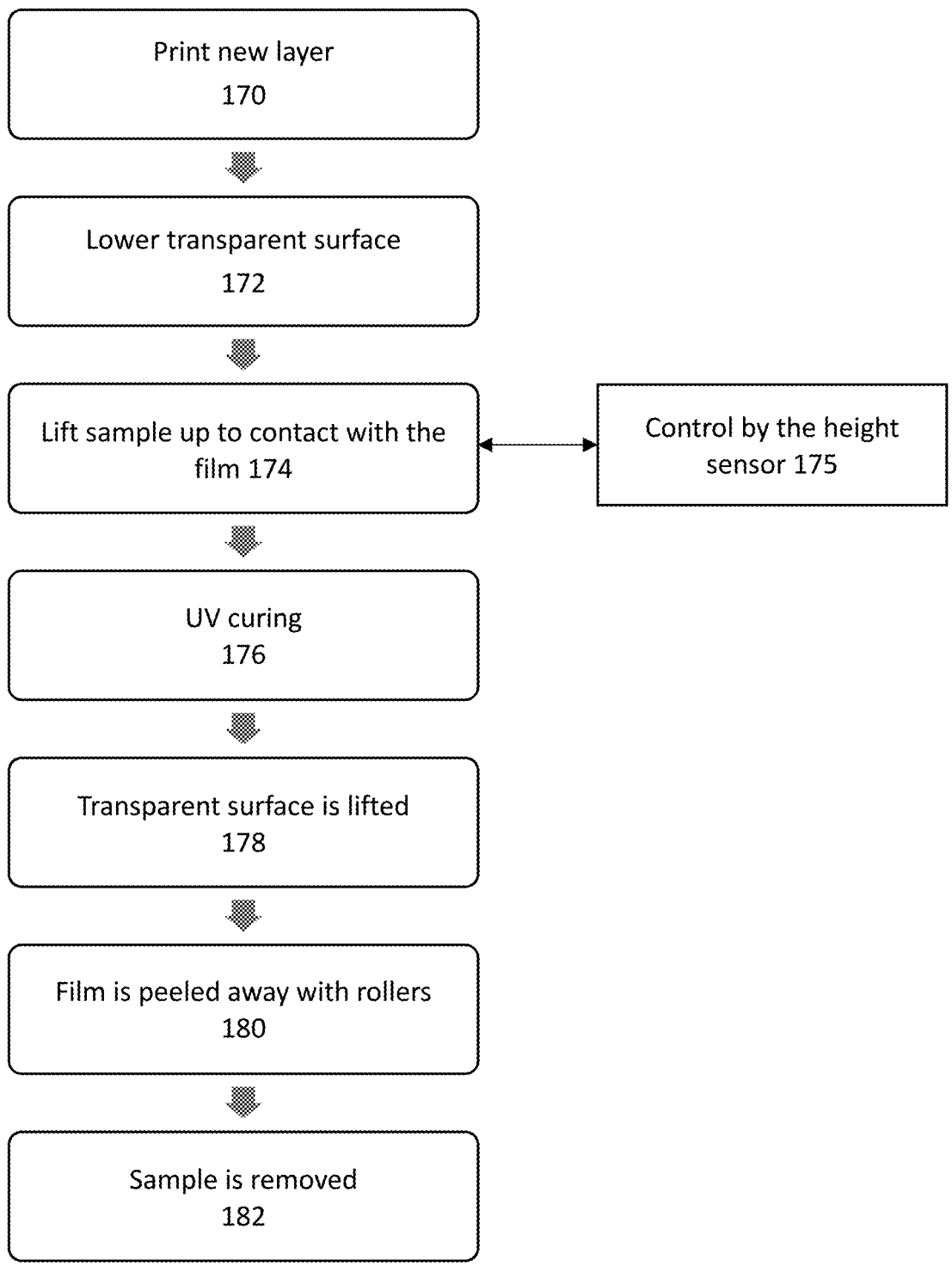
FIG. 5 is a flow chart illustrating steps of a process of the operation of the UV curing system in accordance with an embodiment of the present invention.

Further details regarding the actions of the rollers are best understood with reference to FIGS. 4*a*, 4*b*, and 4*c*. In FIG. 4*a*, the transparent surface 64 has been lifted away from the workpiece 34. Then to separate the film 62 from the workpiece 34 (that is, the newly-cured layer at the top thereof), a pair of rollers 66 disposed to one side of the film are lifted, e.g., on the order of 0.1-3 mm, away from the film by means of a piston (not shown in this view, but refer to FIG. 11, element 112) that raises an arm (FIG. 11, element 114) on which the rollers are mounted.

As shown in FIGS. 4*b* and 4*c*, the arrangement of the rollers creates an angle between the newly-cured layer of the workpiece 34 and the film 62 at a line of detachment extending transversely (into the page in the view shown in the figures) across the top surface of the workpiece. If tension is maintained in the film 62 during separation from the workpiece 34, the film will continue to remain in contact with the lower roller 66*l* and separate from the workpiece at a small angle of separation 74, as shown in FIG. 4*b*. However, if the tension in the film is released as the rollers move, the film 62 adheres to the same point of contact on the workpiece 34, and winds around the upper roller 66*u*, as shown in FIG. 4*c*. This widens the angle of separation 76 when the film is again put under tension.

Figure 8:
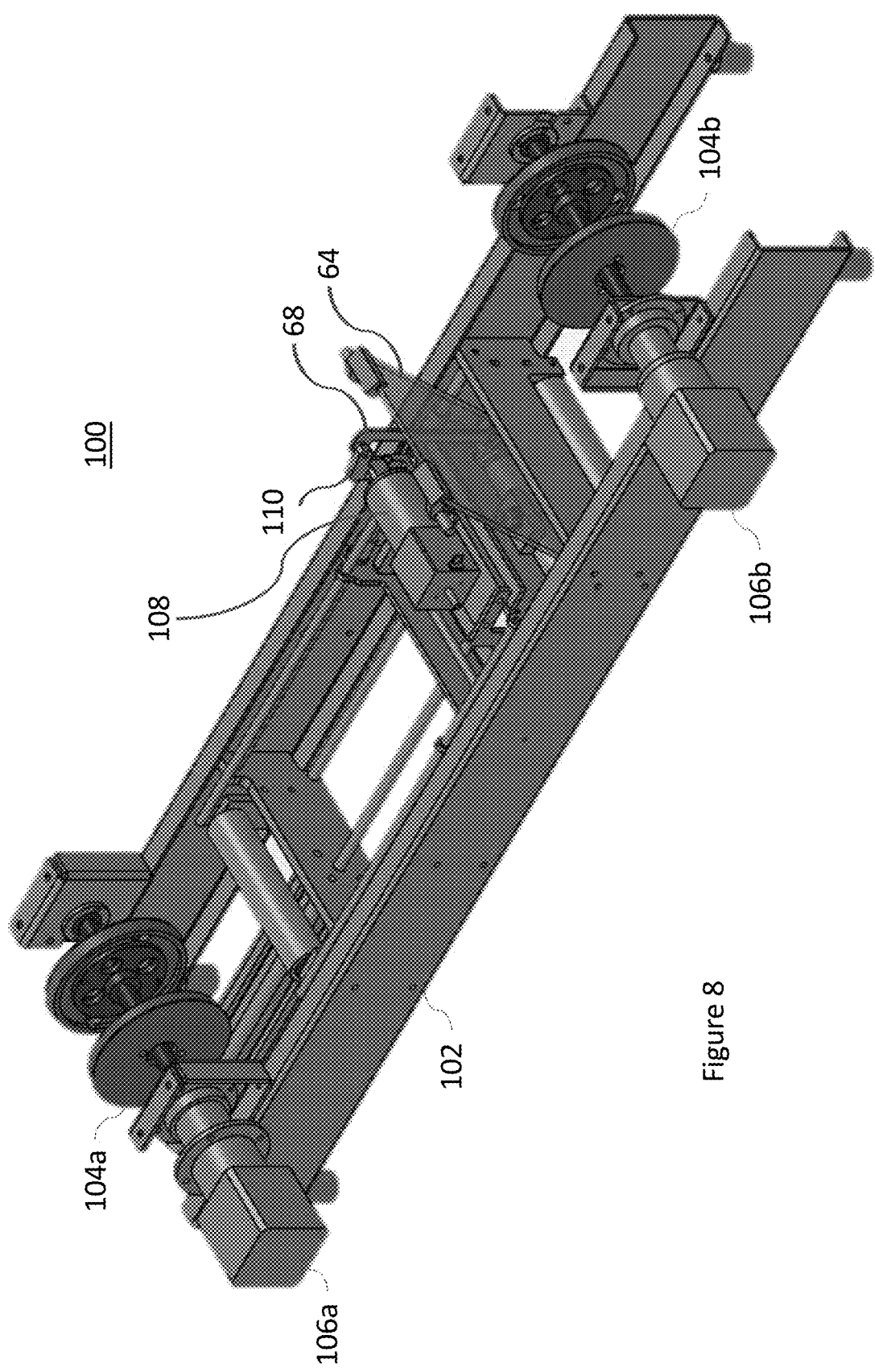

Peeling of the film is optimized by periodically releasing tension in the film. During the separation process, a frame on which the pair of rollers 66 rests slides towards an opposite end of the workpiece, peeling the film 62 from the workpiece. When this operation is performed under the conditions described with reference to FIG. 4*c*, in which there is a large angle of separation between film 62 and the surface of workpiece 34, a peeling force is only applied to a narrow area of the top layer of the workpiece 34. This allows the film 62 to separate from the workpiece 34 while applying minimal force on the newly cured layer in the plane of the surface of the workpiece (i.e., x-y plane in FIGS. 4*b* and 4*c*), thereby minimizing damage to the newly cured layer of the workpiece. Thus, the film 62 is removed from the workpiece starting from one side thereof and ending on the other side, as opposed to separating from the entire newly-cured surface of the workpiece all at once. This concentrates the force separating the film from the workpiece to one line for optimal separation, and minimal elastic deformation of the newly cured layer in the z-direction before separation. The film may be maintained under tension during this entire process using motors on take up reels for the film (not shown in these views but refer to FIG. 8, elements 104*a*, 104*b*, and 106*a*, 106*b*).

Above it was mentioned that in some instances the transparent surface 64 may be lowered into position over film 64 after the workpiece 34 is raised to make contact with the film. Alternatively, as shown in the flowchart in FIG. 5, and suggested in FIGS. 7*a*-7*b* and 3*a*-3*b*, for example, a layer printing sequence may be initiated (170) by lowering the transparent surface 64 into position over film 64 (172) and then raising the workpiece 34 so that the UV curable layer contacts the film (174). This process may be under control of the height sensor 70 according to reflectivity measurements as discussed above (175). After the UV curing (176) is complete, the transparent surface 64 is lifted (178) and the film peeled away (180) from the workpiece. The workpiece with the newly cured layer is then removed (182) or a further layer printed.

Referring now to FIGS. 8-12, an example of an assembly 100 for carrying a thin transparent film 62 for use in accordance with embodiments of the invention is described. The assembly includes a frame 102 on which are mounted opposing reels 104*a*, 104*b* for carrying the film 62. The reels are operated by respective motors 106*a*, 106*b*, for example stepper motors, under the control of a programmable controller (not shown). The assembly 100 also supports the transparent surface 64, mounted on rotating arm 68. The rotating arm is operated by motor 108 and is attached thereto by way of an appropriate linkage 110. In operation, the film 62 may be advanced between UV curing processes by spooling out film from one reel and taking it up on the other. This gives the device the ability to refresh and replace the planarizing surface by advancing the film and also avoids material contamination between curing steps.

As noted above, in this embodiment of the invention, oxygen is purged from the surface to be cured using transparent film 62 and transparent planar surface 64. As shown in FIG. 9, after deposition of the UV curable layer 36 on workpiece 34, the workpiece is lifted toward the film and surface. As the workpiece comes into contact with the film and surface, air bubbles are forced out creating an oxygen-free environment for optimal UV curing. This process of forcing out air bubbles can be optimized by controlling the vertical position of the workpiece 34, the tension in the film 62, and the vertical position of the film. For example, and as illustrated in FIG. 10*a*, the tension in the film 62 may be released (e.g., by way of controlling the reels 104*a*, 104*b*, and/or the rollers 66) so that the bottom of the film 62 is located approximately above the center of the workpiece 34. As the sample is lifted, as shown in FIG. 10*b*, the tension in the film 62 is increased and the area of contact gradually widens to cover the entire UV curable layer 36. In this way, the film pushes air bubbles to the side as it comes to rest on the UV curable layer. Another possible approach is to control the height of the film. As shown in FIG. 10*c*, the film 62 is brought into contact with the UV curable layer 36 on one side thereof. On the other, the film is suspended above the workpiece. Then, as shown in FIG. 10*d*, the film 62 is gradually lowered, e.g., by controlling the position of rollers 66, and the area of contact gradually widens to cover the entire UV curable layer 36.

After the film 62 has come into full contact with the workpiece, the transparent surface 64 is lowered into contact with the film 62 by way of motor 108 and arm 68. The use of transparent surface 64 increases the planarity of the printed layer on workpiece 34. The UV light is then activated to cure the sample.

Figure 13:
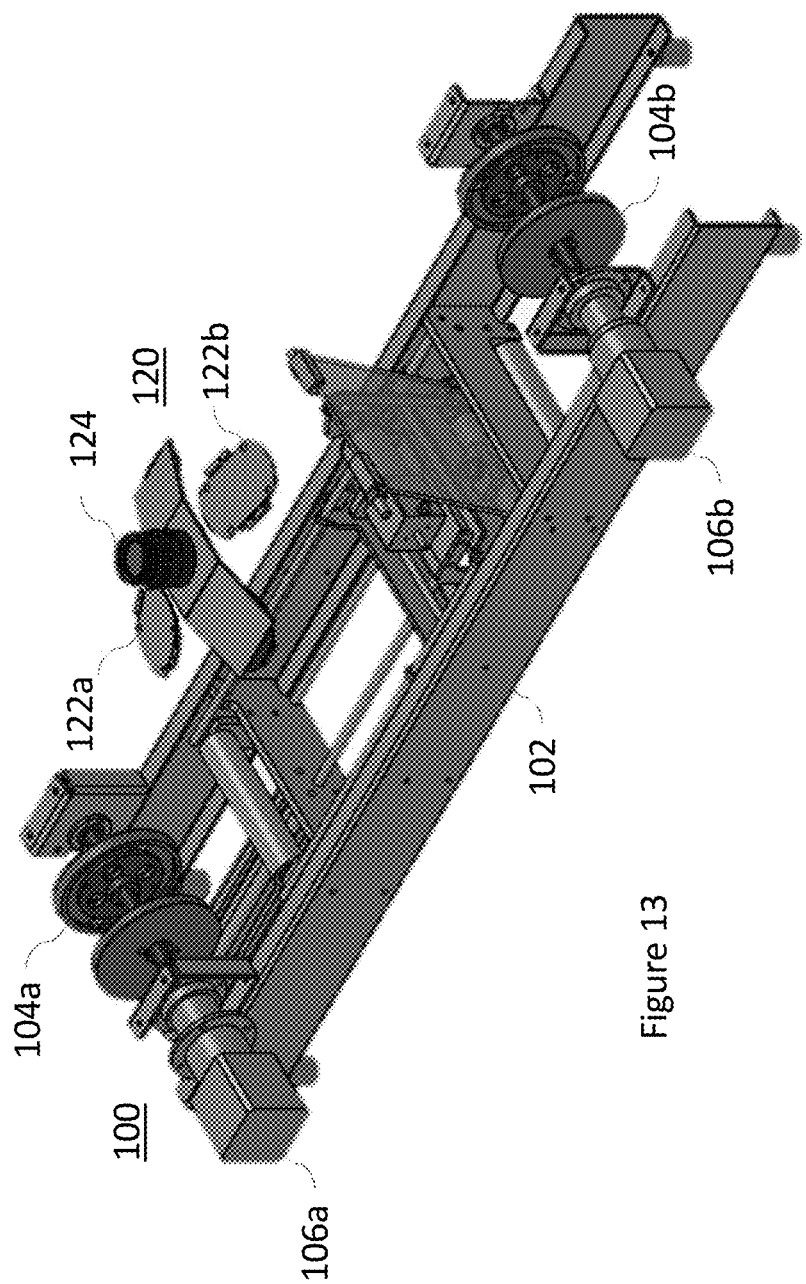
FIGS. 13, 14a, and 14b illustrate aspects of a UV curing module used in connection with the UV curing system shown in FIG. 2.
Figure 14B:
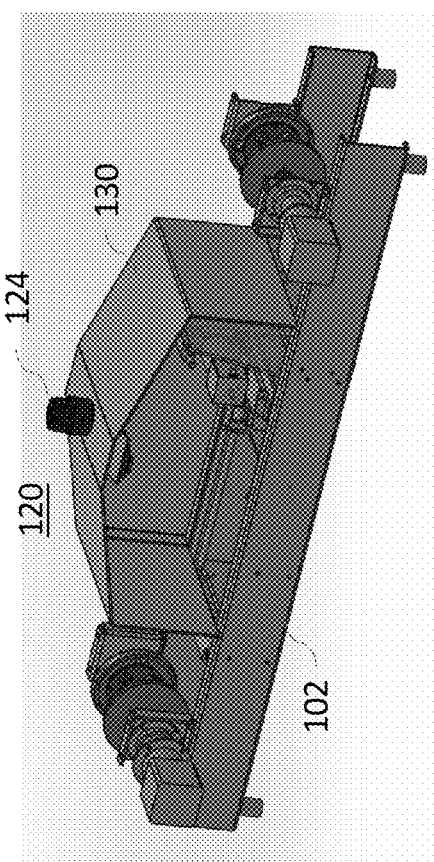
Figure 14A:
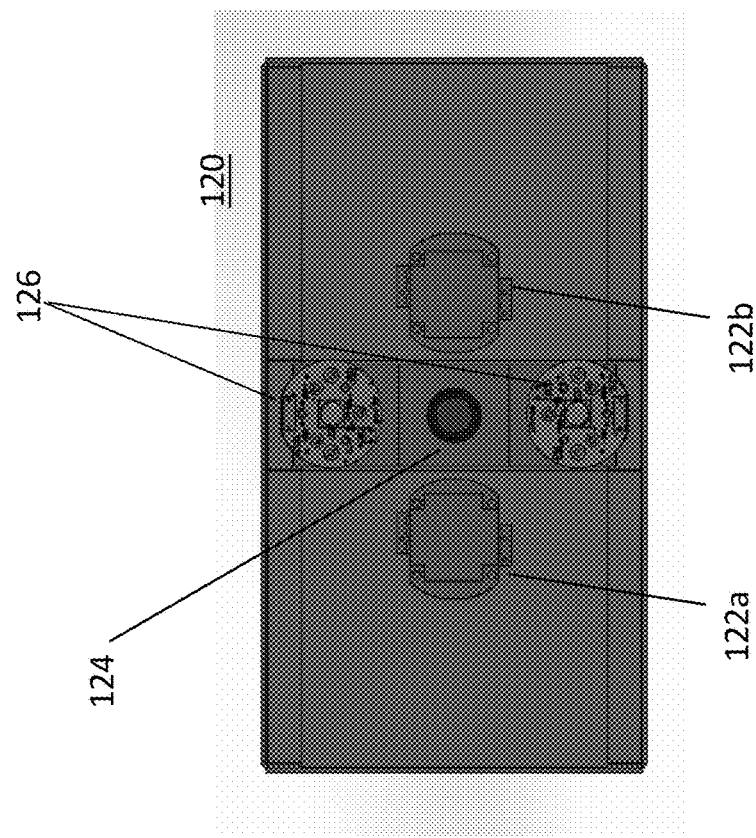

FIGS. 13, 14a, and 14b illustrate an example of the UV curing assembly 120. In this example, the UV curing assembly includes a pair of UV light emitting diode (LED) light modules 122a, 122b, which may include one or more LEDs each. The LEDs emit light at wavelengths suitable for curing the UV curable material in layers 36. Also included is a camera 124. The camera may be used as a height sensor in the fashion described above and/or to image the part under fabrication. FIG. 14a presents a bottom view of the UV curing assembly 120 and shows lighting units 126 for the camera 124. In FIG. 14b, a cut away view of the arrangement of the UV curing assembly 120 within a hood 130 that is disposed over the area of frame 102 within which the workpiece will be situated for curing is shown.

Figure 11:
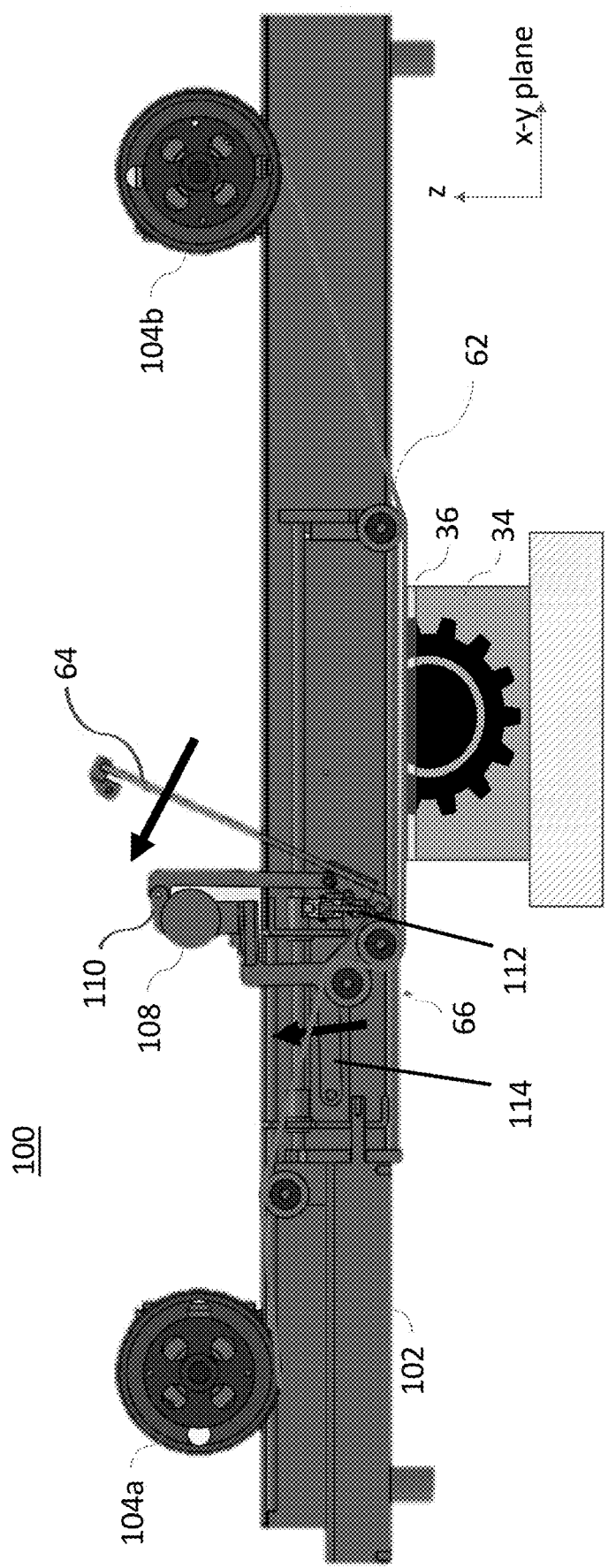
Figure 12:
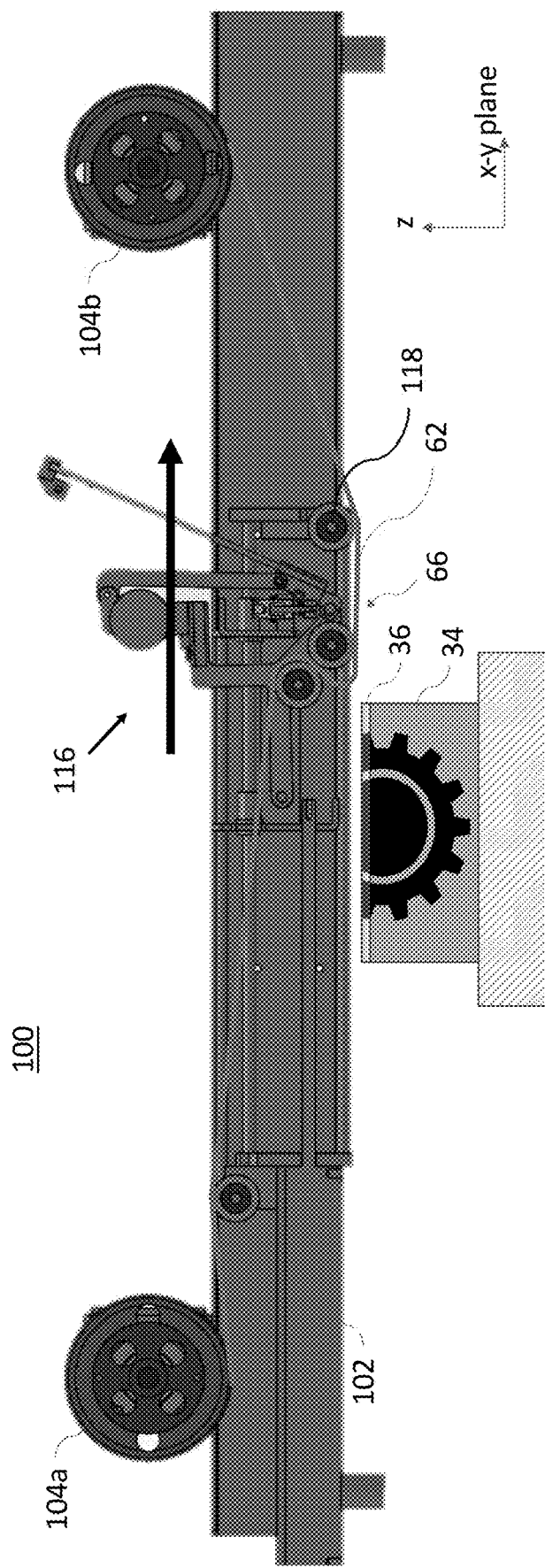

Once the curing is complete, the transparent surface 64 is lifted away from the workpiece, as shown in FIG. 11. As noted above, to separate the film from the workpiece from the film while ensuring minimal damage to the workpiece, rollers 66 on one side of the film 62 are lifted approximately 0.1-3 mm away from the film by way of piston 112 that raises the arm 114 on which the rollers 66 are mounted. The arrangement of the rollers creates a large angle between the film and the surface of the workpiece at the line of detachment, hence, the peeling force when rollers 66 are moved as shown in FIG. 12 is only applied to a narrow area of the top layer of the workpiece. This allows the film 62 to separate from the newly cured material on workpiece 34 while applying minimal force thereon in the x-y plane, thereby minimizing damage to the newly-cured material. During the separation process, the frame on which rollers 66 rest slides toward a third roller 118. In this way, the film 62 is removed from the workpiece starting from one side and ending on the other, as opposed to separating from the entire surface of the workpiece all at once. This concentrates the force separating the film from the workpiece to one line for optimal separation and minimal elastic deformation of the recently cured material in the z-direction before separation. The motors 106a, 106b on the reels 104a, 104b maintain tension in the film 62 during this entire process. As noted above with reference to FIGS. 4b and 4c, if tension is maintained in the film during separation, the film will continue to remain in contact with the lower roller and separate at a small angle of separation. However, if the tension is released as the rollers move, the film adheres to the same point of contact, and winds around the upper roller. This widens the angle of separation when the film is again put under tension.

In another embodiment of the invention, the surface used is only a rigid plate, without a film under tension. The plate is lowered via a motor and a linkage, as in the above-described embodiment, and then the print surface is lifted into contact. After planarization and curing, if necessary, or other post-processing, the plate is lifted away from the print surface.

In yet another embodiment of the invention, the surface used is a thin film held in tension, but there is no rigid plate. The configuration and operation of this embodiment is the same as in the above-described embodiment except that there is no lowering or lifting of a rigid plate to aid in the planarization.

Thus, systems that prevent oxygen inhibition of a light-initiated polymerization reactions by purging the oxygen from reaction surfaces using inert gas flow or by forcing the oxygen away from the reaction surfaces have been described.

What is claimed is:

1. A system for preventing oxygen inhibition of a light-initiated polymerization reaction at ambient conditions, said system comprising:
a first light source for emitting ultraviolet (UV) light;
a UV curing space for accepting a workpiece with a layer of UV curable material on the workpiece;
means for purging oxygen from the UV curing space to facilitate, within the UV curing space, UV curing of the layer of UV curable material on the workpiece at times when the first light source emits the UV light onto the layer of UV curable material, wherein the means for purging oxygen includes a UV-transparent surface to planarize the layer of UV curable material and wherein the UV-transparent surface comprises a thin film in tension, a plate of solid material, or a combination of the thin film in tension and the plate of solid material;
a camera arranged to evaluate reflective properties of the UV-transparent surface so as to determine whether contact has been achieved between the layer of UV curable material on the workpiece and the UV-transparent surface while the layer of UV curable material on the workpiece has not yet been cured by the first light source; and
a height sensor for detecting a height of the workpiece, the height sensor comprising a second light source for emitting a beam of light and a detector for detecting the beam of light, the second light source and detector arranged on opposite sides of the workpiece and adjacent to the UV-transparent surface such that detection of the beam of light by the detector indicates that the workpiece has not yet been raised to an appropriate height for UV curing of the UV curable material to begin, and failure to detect the beam of light by the detector indicates that the workpiece has been raised to the appropriate height for the UV curing of the UV curable material to begin.

2. The system of claim 1, further comprising means for removing the UV-transparent surface from contact with a cured UV-curable layer of the workpiece.

3. The system of claim 2, wherein the UV-transparent surface comprises the thin film in tension.

4. The system of claim 3, wherein the thin film is unwound from a first reel and is wound on a second reel.

5. The system of claim 3, wherein the means for removing comprises a pair of rollers configured to keep the thin film in tension during a removal process.

6. The system of claim 5, wherein the means for removing further comprises an arm on which the pair of rollers is mounted.

7. The system of claim 6, wherein the means for removing further comprises a piston for raising or lowering the arm.

8. The system of claim 1, wherein the UV-transparent surface comprises a plate of solid material.

9. The system of claim 1, wherein the UV-transparent surface comprises the combination of the thin film in tension and the plate of solid material.

10. The system of claim 9, further comprising an arm for placing the plate of solid material on the thin film in tension and removing the plate of solid material from the thin film in tension.

11. The system of claim 1, wherein the camera is configured to detect infra-red light that is reflected from the UV-transparent surface.

12. The system of claim 1, wherein the beam of light comprises infra-red light.

13. The system of claim 1, wherein the detector is configured to detect infra-red light that is present in the beam of light.

14. The system of claim 1, wherein the first light source comprises a first UV light emitting diode (LED) light module and a second UV LED light module.

15. The system of claim 14, wherein the camera is disposed between the first UV LED light module and the second UV LED light module.

16. The system of claim 1, wherein the UV curing space is disposed between the camera and the workpiece.

17. The system of claim 1, wherein the UV curing space is disposed between the first light source and the workpiece.

* * * * *